US007900252B2

(12) United States Patent
Kawano et al.

(10) Patent No.: US 7,900,252 B2
(45) Date of Patent: Mar. 1, 2011

(54) METHOD AND APPARATUS FOR MANAGING SHARED PASSWORDS ON A MULTI-USER COMPUTER

(75) Inventors: Seiichi Kawano, Sagamihara (JP); Tadanobu Inoue, Yokohama (JP); David C. Challener, Raleigh, NC (US); Philip L. Childs, Raleigh, NC (US); Norman A. Dion, II, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1009 days.

(21) Appl. No.: 11/467,812

(22) Filed: Aug. 28, 2006

(65) Prior Publication Data

US 2008/0052777 A1 Feb. 28, 2008

(51) Int. Cl.
*G06F 12/00* (2006.01)
*G06F 12/14* (2006.01)
*H04L 9/00* (2006.01)
*H04L 29/06* (2006.01)

(52) U.S. Cl. .............................. 726/18; 380/44; 380/45; 726/16; 726/17; 726/19; 726/28; 713/166; 713/182; 713/186

(58) Field of Classification Search ...................... 726/2, 726/16, 17, 18, 19, 26, 27, 28; 713/1, 2, 713/182, 155, 156, 157, 164, 166, 168, 175, 713/176, 177, 185, 186; 380/44, 45, 259, 380/260, 277, 278, 279, 281, 282
See application file for complete search history.

(56) References Cited

U.S. PATENT DOCUMENTS 5,586,301 A * 12/1996 Fisherman et al. .......... 711/152

5,931,948 A * 8/1999 Morisawa et al. ............. 726/19

(Continued)

FOREIGN PATENT DOCUMENTS

JP 2004-078539 3/2004

(Continued)

OTHER PUBLICATIONS

Chin-Chen Chang, Iuon-Chang Lin, Hui-Min Tsai, Hsiao-Hsi Wang, "A key assignment scheme for controlling access in partially ordered user hierarchies", Mar. 29-31, 2004, Advanced Information Networking and Applications, 2004. AINA 2004. 18th International Conference on, vol. 2, On pp. 376-379.*

(Continued)

*Primary Examiner* — Michael Pyzocha
*Assistant Examiner* — Hilary Branske
(74) *Attorney, Agent, or Firm* — Antony P. Ng; Dillon & Yudell LLP

(57) ABSTRACT

A method for managing shared passwords on a multi-user computer system is disclosed. A set of shared passwords and an administrator internal key are initially generated. After the receipt of an administrator external key, the administrator internal key is encrypted with the administrator external key. For each user level within the computer system, an internal key is generated by hashing the administrator internal key. For each user level within the computer system, each of the shared passwords encrypted with a respective one of the internal keys. The internal keys and the encrypted shared passwords are then stored in a non-volatile storage device.

16 Claims, 16 Drawing Sheets

U.S. PATENT DOCUMENTS

| | | | | |
|---|---|---|---|---|
| 6,049,878 | A * | 4/2000 | Caronni et al. | 726/3 |
| 6,282,649 | B1 * | 8/2001 | Lambert et al. | 713/167 |
| 6,351,813 | B1 * | 2/2002 | Mooney et al. | 713/185 |
| 6,370,649 | B1 * | 4/2002 | Angelo et al. | 726/18 |
| 6,584,566 | B1 * | 6/2003 | Hardjono | 713/163 |
| 6,735,313 | B1 * | 5/2004 | Bleichenbacher et al. | 380/241 |
| 6,760,843 | B1 * | 7/2004 | Carter | 726/10 |
| 6,970,562 | B2 * | 11/2005 | Sandhu et al. | 380/30 |
| 7,111,321 | B1 * | 9/2006 | Watts et al. | 726/2 |
| 7,266,699 | B2 * | 9/2007 | Newman et al. | 713/182 |
| 7,272,231 | B2 * | 9/2007 | Jonas et al. | 380/281 |
| 7,350,022 | B2 * | 3/2008 | Mizuno et al. | 711/112 |
| 2002/0091920 | A1 * | 7/2002 | Sasaki et al. | 713/100 |
| 2003/0179885 | A1 * | 9/2003 | Gentry et al. | 380/277 |
| 2004/0153554 | A1 * | 8/2004 | Kawakami | 709/229 |
| 2004/0215661 | A1 * | 10/2004 | Zhang et al. | 707/104.1 |
| 2005/0138393 | A1 * | 6/2005 | Challener et al. | 713/186 |
| 2005/0177744 | A1 * | 8/2005 | Herman | 713/200 |
| 2005/0257272 | A1 * | 11/2005 | Nakao | 726/26 |
| 2006/0075256 | A1 * | 4/2006 | Hagiwara et al. | 713/186 |

FOREIGN PATENT DOCUMENTS

JP      2006-023943      1/2006

OTHER PUBLICATIONS

Iuon-Chang Lin, Min-Shiang Hwang, Chin-Chen Chang, A new key assignment scheme for enforcing complicated access control policies in hierarchy, Future Generation Computer Systems, vol. 19, Issue 4, Selected papers from the IEEE/ACM International Symposium on Cluster Computing and the Grid, Berlin-Brandenburg Academy of Sciences and Humanities.*

Chu-Hsing Lin, "Hierarchical key assignment without public-key cryptography", 2001, Elsevier, Computers & Security vol. 20, No. 7, pp. 612-619.*

Bissonnette et al., Canadian Patent Application Publication 2,187,855 A1, 1997.*

* cited by examiner

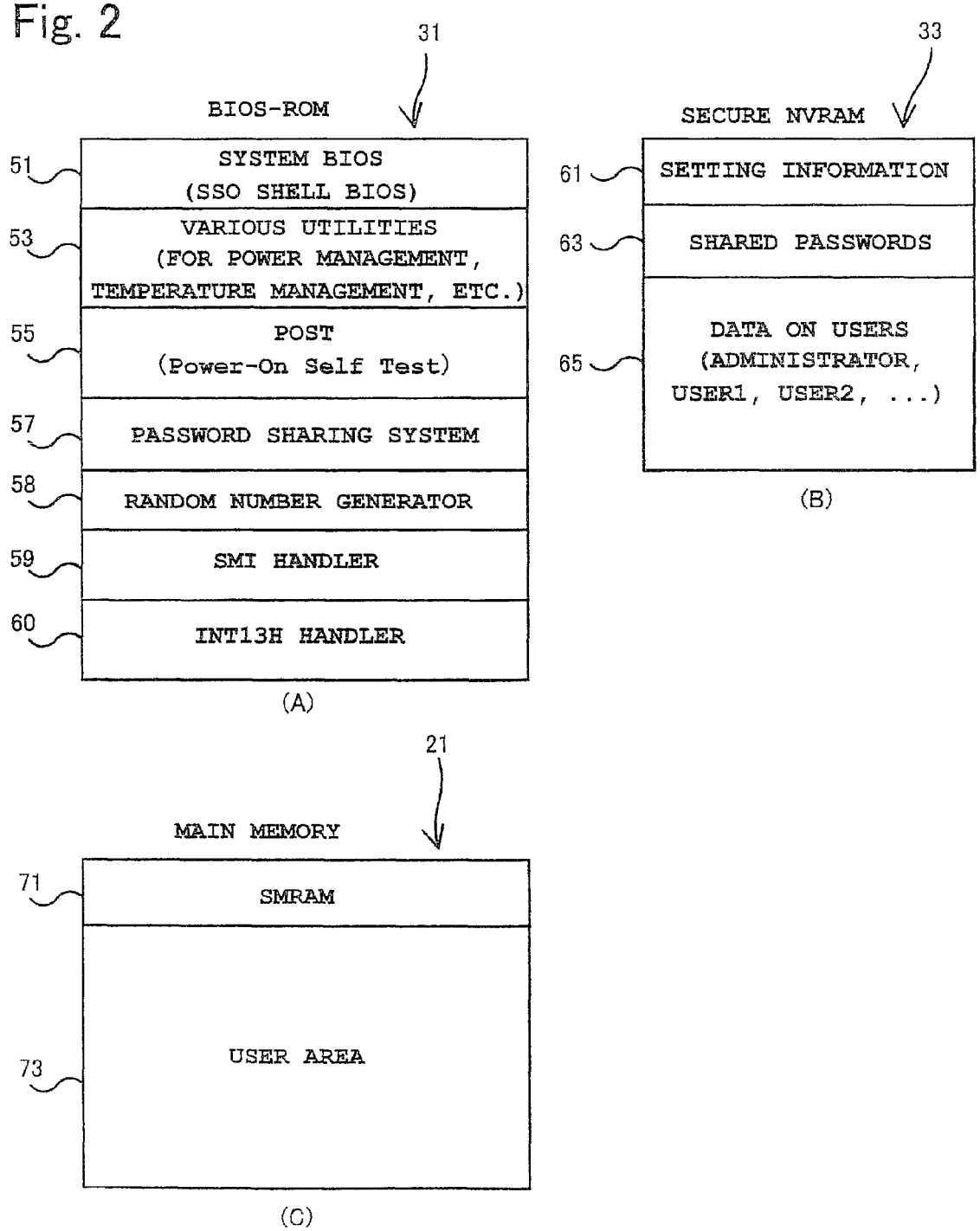

Fig. 3

|  | USER LEVEL 0 (ADMINISTRATOR) | USER LEVEL 1 (MANAGER) | USER LEVEL 2 (GENERAL USER) |
|---|---|---|---|
| MODIFY BIOS SETTINGS | ALL ALLOWED | PARTLY ALLOWED | NOT ALLOWED |
| EDIT USER INFORMATION | ALL ALLOWED | PARTLY ALLOWED | NOT ALLOWED |
| START OS | ALLOWED | ALLOWED | ALLOWED |
| AVAILABLE PASSWORDS — SUPERVISOR PASSWORD | ○ | | |
| AVAILABLE PASSWORDS — MANAGER PASSWORD | | ○ | |
| AVAILABLE PASSWORDS — POWER-ON PASSWORD | ○ | ○ | ○ |
| AVAILABLE PASSWORDS — HDD PASSWORD | | | ○ |

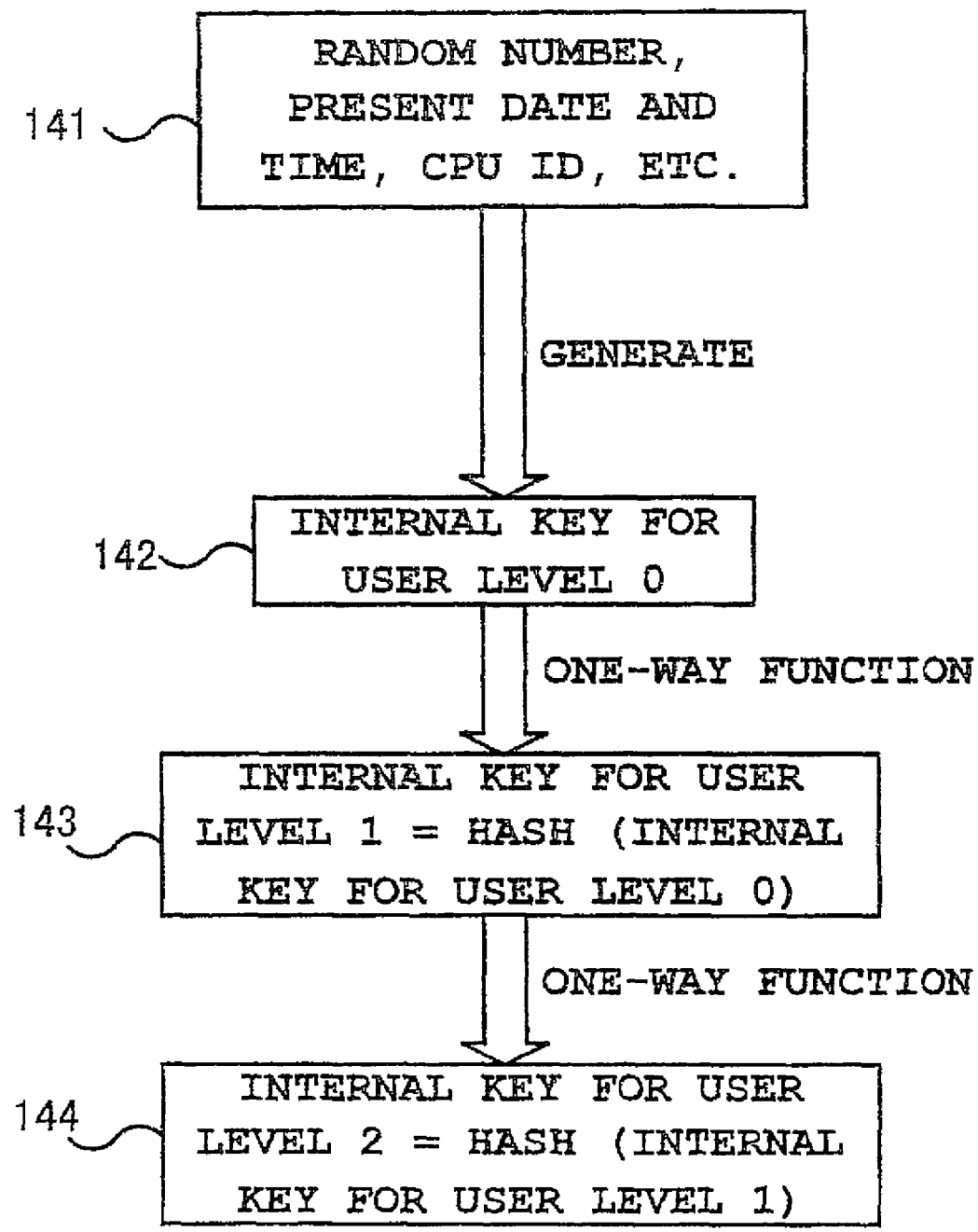

Fig. 5

| 63 | | | |
|---|---|---|---|
| 151 | SUPERVISOR PASSWORD | 7f8D5dG9... | ENCRYPTED WITH INTERNAL KEY FOR USER LEVEL 0 |
| 152 | MANAGER PASSWORD | 59C0a7Jb... | ENCRYPTED WITH INTERNAL KEY FOR USER LEVEL 1 |
| 153 | POWER-ON PASSWORD | xuFa9A85... | ENCRYPTED WITH INTERNAL KEY FOR USER LEVEL 2 |
| 154 | HDD PASSWORD | 9A7rR0ob... | |

65

100:
| | | | |
|---|---|---|---|
| 101 | INDEX (USER ID) | admin | PLAIN TEXT |
| 102 | USER ID | admin | ENCRYPTED WITH EXTERNAL KEY OF USER admin |
| 103 | USER LEVEL | 0 (ADMINISTRATOR) | |
| 104 | INTERNAL KEY | (INTERNAL KEY FOR USER LEVEL 0) | |
| 105 | LAST UPDATED DATE | 2006/5/31 | |
| 106 | OTHER INFORMATION | USER NAME<br>USER'S DIVISION<br>TPM DATA<br>OS LOGIN ID/PASSWORD<br>... | |

110:
| | | | |
|---|---|---|---|
| 111 | INDEX (USER ID) | user 1 | PLAIN TEXT |
| 112 | USER ID | user 1 | ENCRYPTED WITH EXTERNAL KEY OF USER user 1 |
| 113 | USER LEVEL | 1 (MANAGER) | |
| 114 | INTERNAL KEY (REST OMITTED) | (INTERNAL KEY FOR USER LEVEL 1)<br>. . . | |

120:
| | | | |
|---|---|---|---|
| 121 | INDEX (USER ID) | user 2 | PLAIN TEXT |
| 122 | USER ID | user 2 | ENCRYPTED WITH EXTERNAL KEY OF USER user 2 |
| 123 | USER LEVEL | 2 (GENERAL USER) | |
| 124 | INTERNAL KEY (REST OMITTED) | (INTERNAL KEY FOR USER LEVEL 2) (REST OMITTED)<br>. . . | |

(REST OMITTED)

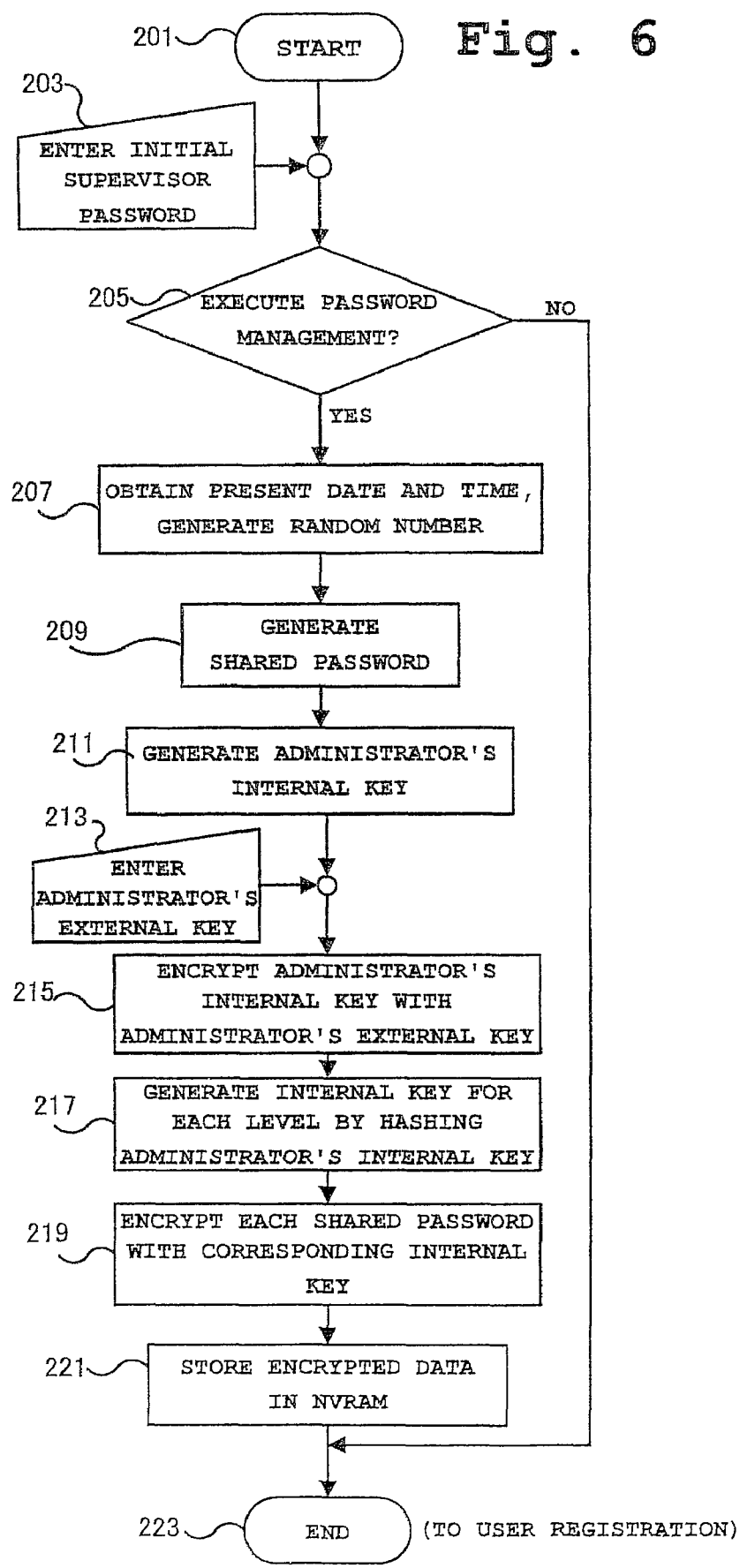

Fig. 7

251 — Enter the initial supervisor password:
> ********
Enter again the initial supervisor password:
> ********

253 — Do you want to enable multi-user password management?(Y/N):
> Y

255 — Enter the administrator's login ID:
> admin
Enter the administrator's login password:
> ********
Enter again the administrator's login password:
> ********

Fig. 9

351 — Enter the administrator's login ID:
> admin
Enter the administrator's login password:
> ********

353 — Enter the name of admin:
>Yamada Ichiro
Enter the division admin belongs to:
>general affairs department, management division, 1st system management section
Enter the OS login ID of admin:
> admin
(REST OMITTED)

355 — The following information is registered. OK? (Y/N):
ID: admin
level: administrator
name: Yamada Ichiro
division: general affairs department, management division, 1st system management section
OS login ID: admin
(OMITTED)
>Y 357 — Do you finish user registration? (Y/N):
>N 359 — Enter the user ID of a user to be registered next:
>user1
Enter the initial password of user1:
>********
Enter again the initial password of user1:
>********
Enter the level of user1:
(0: administrator, 1: manager, 2: general user):
>1
Enter the name of user1:
>Suzuki Saburo
Enter the division user1 belongs to:
>sales department, 1st sales division
Enter the OS login ID of user1:
>user1
(REST OMITTED)

Fig. 11

451 — Enter the login ID:
>user1
Enter the login password of user1:
>********

453 — Login succeeded. Select the next operation:
0: Start the OS
1: Configure the system BIOS
2: Set a user password
3: Change shared passwords
4: Edit user information
(The OS is started if no entry for ten seconds.)
>

455 — Enter the new password of user1:
>********
Enter again the new password of user1:
>********

457 — Enter the name of a user to be edited:
>user2
Enter the new password of user2:
>********
Enter again the new password of user2:
>********
Enter the level of user2:
(0: administrator, 1: manager, 2: general user):
>2
(REST OMITTED)

Fig. 14

551 — Enter the login ID:
>user1
Enter the login password of user1:
>********

553 — Do you want to change shared passwords? (Y/N):
>Y

555 — Enter the new manager password:
>********
Enter again the new manager password:
>********
Enter the new HDD password:
>********
Enter again the new HDD password:
>********

METHOD AND APPARATUS FOR MANAGING SHARED PASSWORDS ON A MULTI-USER COMPUTER

BACKGROUND OF THE INVENTION

1. Technical Field

The present invention relates to computer security in general, and in particular to a method and apparatus for maintaining computer security on a multi-user computer. Still more particularly, the present invention relates to a method and apparatus for providing password management on a multi-user computer.

2. Description of Related Art

Notebook personal computers (PCs) are more susceptible to theft because of their portability. If a notebook PC is stolen and data are taken out of its hard disk drive, the damage can be serious. In particular, these days, a hard disk drive often includes personal information, business information, and/or authentication information for accessing a network or online service that requires user authentication. Thus, it is important to take measures in protecting data in a notebook PC in case the notebook PC falls in the wrong hands. More specifically, it is important to prevent a notebook PC from being started and used by someone who is not an authorized user, and to prevent data from being extracted from a hard disk drive even if the disk drive is removed from the notebook PC and attached to another computer.

A commonly solution is to set passwords for the Basic Input/Output System (BIOS) and the hard disk drive of a notebook PC so that the BIOS and the hard disk drive cannot be used unless the passwords are properly entered. There are generally two types of passwords for the BIOS, namely, a power-on password and a supervisor password. When a notebook PC with password settings is started, the notebook PC prompts for a password. Then, either the power-on password or the supervisor password needs to be entered. If the power-on password is entered and properly authenticated, only starting of an operating system (OS) is allowed. If the supervisor password is entered and properly authenticated, operations such as modification of the BIOS settings and setting of the power-on password are allowed in addition to starting of the OS.

ATA/ATAPI is a common interface for connecting an external storage device to a computer, and the password for the hard disk drive (HDD password) is included in the standard ATA/ATAPI specification. The HDD password can also be set via the BIOS. If the HDD password is set, starting the notebook PC causes the BIOS to input the HDD password to the hard disk drive and to make the hard disk drive usable. If a password for the BIOS is also set, the HDD password is input to the hard disk drive only when the BIOS properly authenticates the power-on password or the supervisor password. The power-on password, supervisor password, and HDD password can be collectively called a shared password.

There are many prior art techniques related to shared passwords. For example, one prior art technique requires the BIOS to generate an HDD password and sets the password for a hard disk drive, and on power-up of a computer, the BIOS inputs the password to the hard disk drive. As a result, data cannot be read from the hard disk drive even if the hard disk drive is removed from the computer and attached to another computer. Another prior art technique for a computer having multiple storage devices, in which inputting a password to a first storage device causes passwords stored in the first storage device to be input to other storage devices. As a result, security of the multiple storage devices can be protected with only one password for the first storage device.

Even in notebook PCs, commonly used OSs such as the Windows™ OS or the Linux OS are adaptable to multi-user mode. In fact, it is not uncommon that one notebook PC is used by multiple users. In that case, the administrator of the OS registers a different user ID and password for each user, and each user logs in to the OS using the assigned user ID and password. However, the shared passwords are not adaptable to multi-user mode according to their standards. Therefore, even when a notebook PC is used by multiple users, all users of the notebook PC know and use the same shared passwords. This is not desirable from the standpoint of computer security. In order to achieve the high security protected by the shared password in a notebook PC used by multiple users, it is desirable that the shared password to be different for each user.

FIG. 16 is a block diagram showing the application of a technique of user authentication using biometrics information, such as a fingerprint, vein, or iris, for solving the above-mentioned problem. Biometrics information 601 on each user and a shared password 603 are associated with each other and are stored in a non-volatile storage device 605 within a notebook PC. When biometrics information 609 on a user is input from a biometrics information input apparatus 607, a determination is made as to whether or not non-volatile storage device 605 contains biometrics information identical with the information read by biometrics information input apparatus 607. If biometrics information 601 identical with the read information exists within non-volatile storage device 605, shared password 603 corresponding to that biometrics information 601 is input to a BIOS 611 and a hard disk drive 613. Thus, the users need not know their shared password, and this ensures high computer security because the shared password is used only inside the notebook PC.

However, with the technique shown in FIG. 16, biometrics information 601 and shared password 603 need to be associated with each other and stored in non-volatile storage device 605. That is, every registration of biometrics information 601 on a user requires input of shared password 603, thereby revealing shared password 603 to the user. In addition, it is desirable to change the password from time to time to ensure security, but every change of shared password 603 requires an operation of associating changed shared password 603 with biometrics information 601 on all users. This operation is cumbersome and renders a risk of revealing shared password 603 to all users.

Consequently, it would be desirable to provide an improved method and apparatus for managing shared passwords on a multi-user computer.

SUMMARY OF THE INVENTION

In accordance with a preferred embodiment of the present invention, a set of shared passwords and an administrator internal key are initially generated. After the receipt of an administrator external key, the administrator internal key is encrypted with the administrator external key. For each user level within the computer system, an internal key is generated by hashing the administrator internal key. For each user level within the computer system, each of the shared passwords encrypted with a respective one of the internal keys. The internal keys and the encrypted shared passwords are then stored in a non-volatile storage device.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 2 is a detailed diagram of the internal structure of a BIOS flash ROM, a secure NVRAM, and a main memory within the notebook PC from FIG. 1;

FIG. 3 is a diagram showing user levels and the authority at each user level;

FIG. 4 is a diagram showing generation of internal keys;

FIG. 5 is a diagram showing the detailed data structures of encrypted shared passwords and data on each user;

FIG. 6 is a flowchart of initialization processing of a password sharing system;

FIG. 7 is a diagram showing the content displayed on a screen during the execution of the initialization processing shown in FIG. 6;

FIG. 9 is a diagram showing the content displayed on the screen during the execution of the user registration processing shown in FIG. 8;

FIG. 11 is a diagram showing the content displayed on the screen during the execution of the user login processing shown in FIG. 10;

FIG. 14 is a diagram showing the content displayed on the screen during the execution of the changing shared passwords shown in FIG. 13;

DETAILED DESCRIPTION OF A PREFERRED EMBODIMENT

Figure 1:
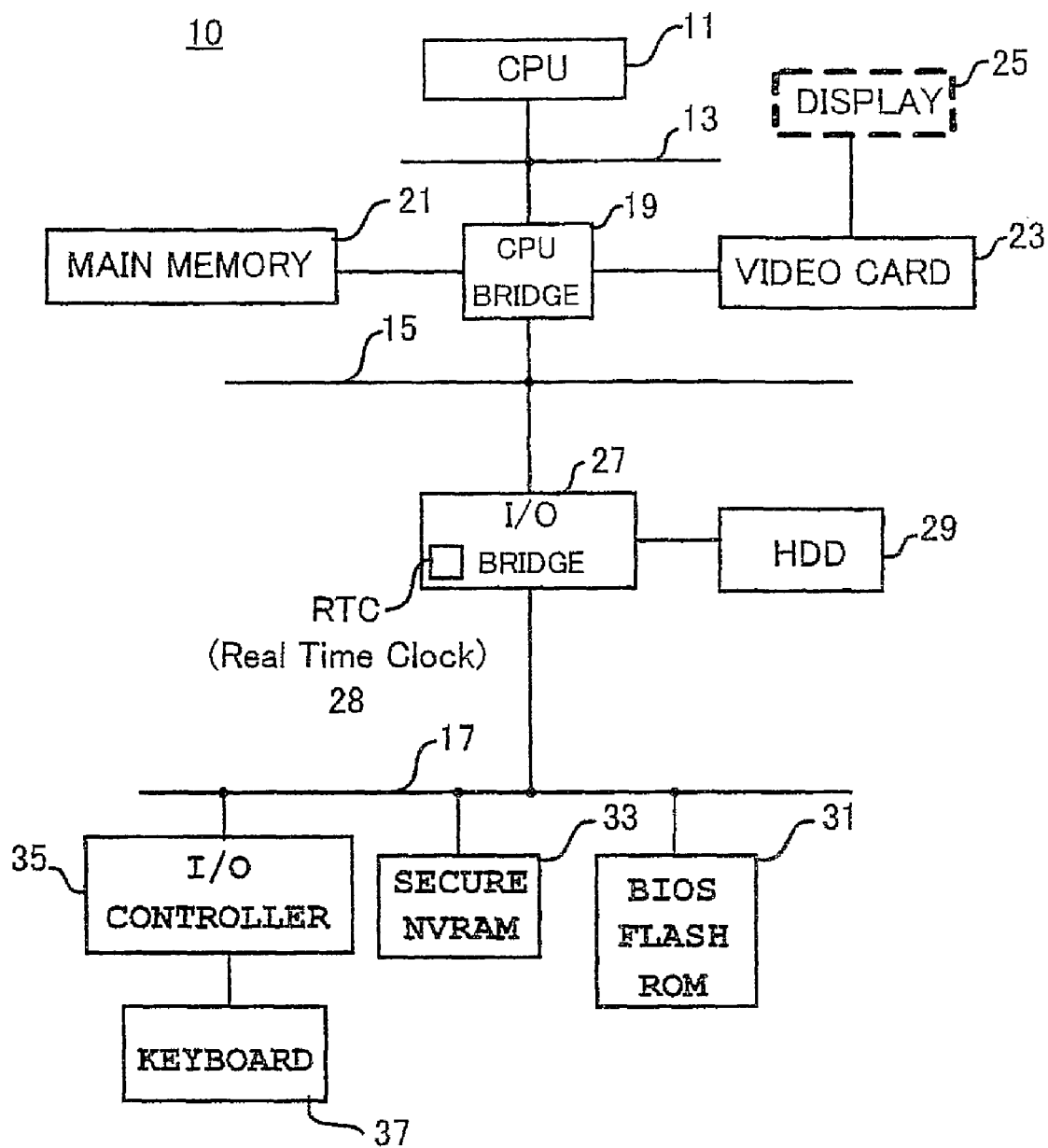
FIG. 1 is a block diagram of a notebook personal computer (PC) in which a preferred embodiment of the present invention is incorporated.

Referring now to the drawings and in particular to FIG. 1, there is depicted a block diagram of a notebook personal computer (PC) 10, in accordance with a preferred embodiment of the present invention. A central processing unit (CPU) 11 is responsible for the central functionality of notebook PC 10 and executes an OS, BIOS, device drivers, application programs, etc. CPU 11 can operate in a System Management Mode (SMM), which is an operating mode for system management, when an System Management Interrupt (SMI) input pin (SMI#) is asserted. In SMM, an SMI handler, which is an interrupt control handler residing in CPUs manufactured by the Intel Corporation, is executed in a specially allocated memory space. SMM is a privileged execution mode mainly used for suspend, resume, power management, and security-related operations.

CPU 11 sends and receives signals while being connected to devices via three stages of buses, namely, a Front Side Bus (FSB) 13 as a system bus, a Peripheral Component Interconnect (PCI) bus 15 for communication between CPU 11 and peripheral devices, and a Low Pin Count (LPC) bus 17, which is an interface taking the place of an ISA bus. FSB 13 and PCI bus 15 are connected with each other via a CPU bridge 19 called a memory/PCI chip. CPU bridge 19 has functions such as a memory controller function for controlling accesses to a main memory 21 and a data buffer function for absorbing the difference of the data rate between FSB 13 and PCI bus 15. The main memory 21 is writable memory used as an area into which programs executed by CPU 11 are read, and as a working area to which processing data is written. Main memory 21 also includes an area used as System Management random access memory (SMRAM), which will be described later. A video card 23 has a video chip (not shown) and VRAM (not shown). In response to a rendering instruction from CPU 11, video card 23 generates a rendering image and writes it to the VRAM, and sends the image read from the VRAM to a display 25 as rendering data.

PCI bus 15 and LPC bus 17 are connected with each other via an I/O bridge 27. I/O bridge 27 includes a Real Time Clock (RTC) 28 that functions as an internal clock of notebook PC 10. I/O bridge 27 further includes an Integrated Device Electronics (IDE) interface function, so that a hard disk drive (HDD) 29 and optical drives such as a CD drive and DVD drive (not shown) are connected thereto. The HDD password required for making hard disk drive 29 usable is included in the specifications of the IDE interface, and the password specified is magnetically stored in a management area of the magnetic disk. Connected to the LPC bus 17 are a BIOS flash ROM 31, a secure non-volatile RAM (NVRAM) 33, and an I/O controller 35. BIOS flash ROM 31 and secure NVRAM 33 will be described later. I/O devices (not shown) including a keyboard 37 are connected to I/O controller 35.

FIG. 2 is a diagram showing the internal structure of BIOS flash ROM 31, secure NVRAM 33, and main memory 21 in notebook PC 10, in accordance with a preferred embodiment of the present invention. BIOS flash ROM 31 shown in FIG. 2(A) is non-volatile memory, the memory content of which is electrically rewritable. BIOS flash ROM 31 stores the following: a system BIOS (SSO Shell Bios) 51, which is a basic program used to start and manage the system; various utilities 53, which are software for managing the operation environment including the power supply and temperature; a Power-On Self Test (POST) 55, which is software for testing the hardware on start of notebook PC 10; a password sharing system 57 according to the present invention; a random number generator 58 for generating random numbers; an SMI handler 59 for operating CPU 11 in SMM; an INT13H handler 60 for accessing hard disk drive 29. Random number generator 58 may be implemented as software or hardware.

Secure NVRAM 33 shown in FIG. 2(B) is a RAM that is powered by a battery so data within NVRAM 33 will not be erased on power-down of notebook PC 10, and for which an operation of system BIOS 51 can set read/write protection of the memory content. Once read/write protection is set by an operation of system BIOS 51, secure NVRAM 33 will be protected until the power of notebook PC 10 is reset. Therefore, it is difficult to remove only read/write protected secure NVRAM 33 and read its content externally. Secure NVRAM 33 stores setting information 61 on device controllers of notebook PC 10, encrypted shared passwords 63, and data 65 on each user. Setting information 61 mainly includes the order of activating the disk devices, the drive numbers, the method of connecting peripheral devices, and parameters about data transfer. Among the shared passwords, passwords used in starting notebook PC 10 are also included in setting information 61.

In main memory 21 shown in FIG. 2(C), an SMRAM area 71 is reserved in addition to a user area 73 used in regular operations of notebook PC 10. When SMI handler 59 is called from system BIOS 51 and CPU 11 enters SMM, CPU 11 operates in a single task mode and all interrupts are disabled. Furthermore, SMRAM area 71 is made exclusively available to CPU 11 operating in SMM mode. While CPU 11 is operating in SMM, no program can be run except a single task operating under the control of system BIOS 51, and no process can access SMRAM area 71 except the relevant program.

In the present embodiment, four passwords are employed as passwords for use in starting notebook PC 10, namely, a power-on password, a manager password, a supervisor password, and an HDD password. If the power-on password and the HDD password are input and properly authenticated, only the starting of the OS is allowed. If the manager password and the HDD password are input and properly authenticated, operations such as modification of part of the BIOS settings is allowed in addition to the starting of the OS. If the supervisor password and the HDD password are input and properly authenticated, all BIOS-related operations are allowed, such as modification of the entire BIOS settings, enabling/disabling of the password sharing system according to the present invention, etc. The OS is installed on hard disk drive 29, and it is started after the BIOS has completed the initial hardware setting.

FIG. 3 is a diagram showing user levels used in the present embodiment and the authority at each user level. The present embodiment provides three user levels. The user level 0 corresponds to an "administrator" who is allowed to perform all operations about settings of the entire BIOS and of all registered users. The user level 1 corresponds to a "manager" who is allowed to perform operations about settings of part of the BIOS and of users at the user levels 1 and 2. The user level 2 corresponds to a "general user" who is not allowed to perform operations about settings of the BIOS and of other users but only allowed to start the OS and modify the user's own settings. In starting notebook PC 10, the "administrator" at the user level 0 uses the supervisor password among the shared passwords, the "manager" at the user level 1 uses the manager password, and the "general user" at the user level 2 uses the power-on password. The HDD password is shared by all users.

The concept of an "external key" and an "internal key" used in the present embodiment and encryption using these keys are now described. In the present embodiment, encryption and decryption with the external key or the internal key are all performed using a common key cryptosystem. That is, given the same key as used for encryption, a cryptogram can be properly decrypted. Examples of known algorithms using the common key cryptosystem include Data Encryption Standard (DES) and Advanced Encryption Standard (AES). Problems with the common key cryptosystem have generally been pointed out, such as the necessity of delivering a key to a user beforehand in a secure manner. However, such problems are not the case with the present embodiment because the keys used for encryption and decryption using the common key cryptosystem are stored in a secure area of notebook PC 10 and also processed in SMM.

The external key is managed and entered individually by each user. For example, the external key may be a password having a character string, or may be biometrics information on each user such as a fingerprint, vein, or iris, or may be electronic information stored on a smart card or a USB token. Of course, a combination of these information items may also be used to the extent of arbitrary choice of those skilled in the art. The description of the present embodiment hereafter assumes that a password includes a character string assigned to each user is used as the external key. The external key may be entered by a user directly on the keyboard of notebook PC 10, or externally via a network interface.

The internal key is usually stored in an encrypted form in secure NVRAM 33. On power-up of notebook PC 10, secure NVRAM 33 is made readable/writable, and the encrypted internal key is copied into SMRAM area 71 of main memory 21. Decryption of the internal key and subsequent processing are all performed only within SMRAM area 71. During processing, CPU 11 is operating in single task SMM. Therefore, the internal key in an unencrypted form will never leak out of main memory 21. On completion of the processing related to the internal key, secure NVRAM 33 is made read/write protected, and then the OS is started. Thereafter, since read/write protection is set for secure NVRAM 33 while the OS is operating, it is impossible to obtain or tamper with the content of the secure NVRAM 33 via the OS. That is, no operation program other than the password sharing system according to the present invention can obtain or tamper with the internal key.

FIG. 4 is a flowchart showing the generation of internal keys, in accordance with a preferred embodiment of the present embodiment. Once the password sharing system according to the present invention is initialized, for example when notebook PC 10 is started for the first time, the internal key of the "administrator" at the user level 0 is first generated (blocks 141 to 142). The internal key for the user level 0 is generated based on information obtained only in this notebook PC 10 at the time of initialization. For example, the information may be a random number generated by random number generator 58, the present date and time available from RTC 28 included in I/O bridge 27, or an ID unique to notebook PC 10 or CPU 11. Although the obtained information may be directly used as the character string, it is more preferable to further convert the character string using a certain function (such as a cryptographic hash function to be described later). Thus, the obtained internal key is unique to this notebook PC 10 and cannot be generated in other computers at other times.

The internal key of the "manager" at the user level 1 is generated by hashing the internal key for the user level 0 (block 143). If hashing a character string A to obtain a character string B is expressed as B=Hash (A), then the internal key for the user level 1=Hash (the internal key for the user level 0). The term "hashing" as used herein refers to converting a character string using a one-way function called a cryptographic hash function. Examples of well known cryptographic hash functions include SHA1, SHA256, and MD 5. These functions have two characteristics, i.e., one-wayness and collision resistance. The one-wayness is a characteristic that it is practically impossible to obtain a character string A from a predetermined character string B, where B=Hash (A). The collision resistance is a characteristic that it is practically impossible to obtain two distinct character strings A1 and A2 that meet B=Hash (A1) and B=Hash (A2). The phrase "practically impossible" as used herein means that actually performing the act is extremely difficult because it requires an enormous amount of computation. Thus, hashing the internal key for the user level 0 can readily provide the internal key for the user level 1, but in contrast, it is practically impossible to provide the internal key for the user level 0 from the internal key for the user level 1.

Similarly, the internal key of the "general user" at the user level 2 is generated as the internal key for the user level 2=Hash (the internal key for the user level 1) (block 144). That is, hashing the internal key for the user level 0 can provide the internal key for the user level 1, and further hashing the internal key for the user level 1 can provide the internal key for the user level 2. However, it is practically impossible to provide the internal keys for the user levels 1 and 0 from the internal key for the user level 2. Similarly, where there are only two user levels or more than four user levels, hashing the internal key of a certain user at one level can provide the internal key of a user at a lower level than the certain user, but it is practically impossible to provide the internal key of a user at an upper level than the certain user.

FIG. 5 is a diagram showing the data structure of encrypted shared passwords 63 and data 65 on each user within secure NVRAM 33. Among encrypted shared passwords 63, supervisor password 151 is encrypted with the internal key for the user level 0. Manager password 152 is encrypted with the internal key for the user level 1. Power-on password 153 and HDD password 154 are encrypted with the internal key for the user level 2. Of course, since all shared passwords are encrypted using the common key cryptosystem, a shared password can be decrypted and used given the same internal key as used for encrypting that shared password.

Thus, the user at the user level 0 can use all internal keys for the user levels 0, 1 and 2, so that the user at the user level 0 can use all encrypted shared passwords. The user at the user level 1 can use the internal keys for the user levels 1 and 2, so that this user can use manager password 152, power-on password 153, and HDD password 154 encrypted with the internal keys for the user levels 1 and 2. However, since the user at the user level 1 cannot obtain the internal key for the user level 0, this user cannot use supervisor password 151. The user at the user level 2 can use only the internal key for the user level 2, so that this user can use power-on password 153 and HDD password 154. However, since the user at the user level 2 cannot obtain the internal keys for the user levels 0 and 1, this user cannot use supervisor password 151 and manager password 152.

Stored in user data 65 are data sets for members in the form encrypted with their respective external keys. A data set 100 for a user ID "admin" at the user level 0 (the administrator) will be described below. At the top of data set 100, a user ID 101 of plain text is stored as an index. All data items but index 101 in data set 100 for the user "admin" are encrypted with this user's external key. Since all this encryption is also based on the common key cryptosystem, the data set can be decrypted and used given the same external key as used for encryption.

Data set 100 for the user "admin" also stores an encrypted user ID 102. When the user enters a user ID and an external key (a password), data set 100 containing the same plain text index 101 as entered user ID is decrypted with the entered external key. Then, a user ID obtained by decrypting encrypted user ID 102 is compared with index 101. If the entered external key is authentic, the plain text index 101 and the user ID obtained by decrypting encrypted user ID 102 will be identical. If the entered external key is not authentic, decrypting encrypted user ID 102 will not result in the user ID identical with index 101. Thus, even though the external key itself is not contained in user data 65, the entered external key can be authenticated. Since the external key does not exist in notebook PC 10, it is practically impossible for anyone but the relevant user to know the external key from the content stored in the notebook PC.

Besides user ID 102, information encrypted with the external key of the user "admin" in data set 100 for this user includes a user level 103, an internal key 104, a last updated date 105, and other information 106. User level 103 provides distinction between the user level 0 "administrator", the user level 1 "manager", and the user level 2 "general user" as described above. Since the user "admin" is the "administrator", the user level is 0. The internal key 104 indicates an internal key for the user level of this user. For the user "admin", the internal key for the user level 0 "administrator" is stored herein. The last updated date 105 indicates the date when the user last updated the user's external key. When a certain days have passed since last updated date 105, the user may be prompted to update the external key. Other information 106 may include the full name of the user, the division the user belongs to, data for use after the OS is started in the notebook PC (e.g., the ID and password to log in to the OS), or data for use in the TPM (Trusted Platform Module), which is a module for enhancing security in the notebook PC.

The same applies to the users other than the user "admin." For example, a data set 110 for a user ID "user 1" at the user level 1 (the manager) contains a user ID 111 of plain text, as well as a user ID 112, a user level 113, an internal key 114, a last updated date, other information, and so forth encrypted with the external key of the user "user1." User level 113 indicates the user level 1 for the "manager", and the internal key 114 indicates the internal key for the user level 1. A data set 120 for a user ID "user2" at the user level 2 (the general user) contains a user ID 121 of plain text, as well as a user ID 122, a user level 123, an internal key 124, a last updated date, other information, so forth encrypted with the external key of the user "user2." User level 123 indicates the user level 2 for the "general user", and internal key 124 indicates the internal key for the user level 2. In this manner, a similar data set is generated for each registered user and stored in secure NVRAM 33. If there are users at the same user level but with different user IDs and external keys, the same internal key is obtained by decrypting the respective data sets. However, the encrypted data is different because their external keys are different.

FIG. 6 is a flowchart of the initialization processing of the password sharing system, in accordance with a preferred embodiment of the present invention. FIG. 7 is a diagram showing the content displayed on a screen of display 25 during the execution of the initialization processing shown in FIG. 6. In FIG. 7, lines beginning with the symbol ">" represent the content entered by an operator via keyboard 37. When a password is entered, all entered characters displayed are replaced with the symbol "*." This initialization processing begins (block 201) when the administrator starts notebook PC 10 for the first time, when the administrator selects the initialization of the system, or the like. Read/write protection is not set for secure NVRAM 33 when the notebook PC is started. SMI handler 59 is called from system BIOS 51, and this causes CPU 11 to operate in SMM. Operation program 57 of the password sharing system is read into SMRAM area 71 of main memory 21.

First, according to a supervisor password entry screen displayed on the display 25, the operator enters an initial supervisor password used in the notebook PC (block 203, screen display 251) and then selects whether or not to enable the password sharing system according to the present invention (block 205, screen display 253). If "N" (NO) is selected, the password sharing system according to the present invention is disabled. The supervisor password entered at block 203 is stored in the system settings 61, and the system initialization processing terminates (block 223). If "Y" (YES) is selected at block 205, a random number is generated by random number generator 58. Also, information available only in this notebook PC, such as the present date and time available from RTC 28 or an ID unique to notebook PC 10 or CPU 11, is obtained (block 207). Based on the obtained information, the shared passwords including the supervisor password are generated (block 209). Further, the internal key for the user level 0 is generated from the random number (block 211). It is also possible at the block 209 to make the operator enter all or some of the shared passwords.

The administrator operating notebook PC 10 is prompted to enter a user ID and a password, which is the administrator's external key (block 213, screen display 255). The internal keys for the user levels 1 and 2 are generated from the internal key for the user level 0 generated at block 211 using the above-described hash function, wherein the internal key for the user level 1=Hash (the internal key for the user level 0) and the internal key for the user level 2=Hash (the internal key for the user level 1) (block 215). Each shared password is encrypted with the internal key for the user level at which each password can be used (block 217). Further, the internal key for the user level 0 is encrypted with the administrator's external key entered at block 213 (block 219). The data items encrypted in this manner are stored in secure NVRAM 33 (block 221). Thus, the initialization of the password sharing system according to the present invention is completed (block 223) followed by user registration processing.

Figure 8:
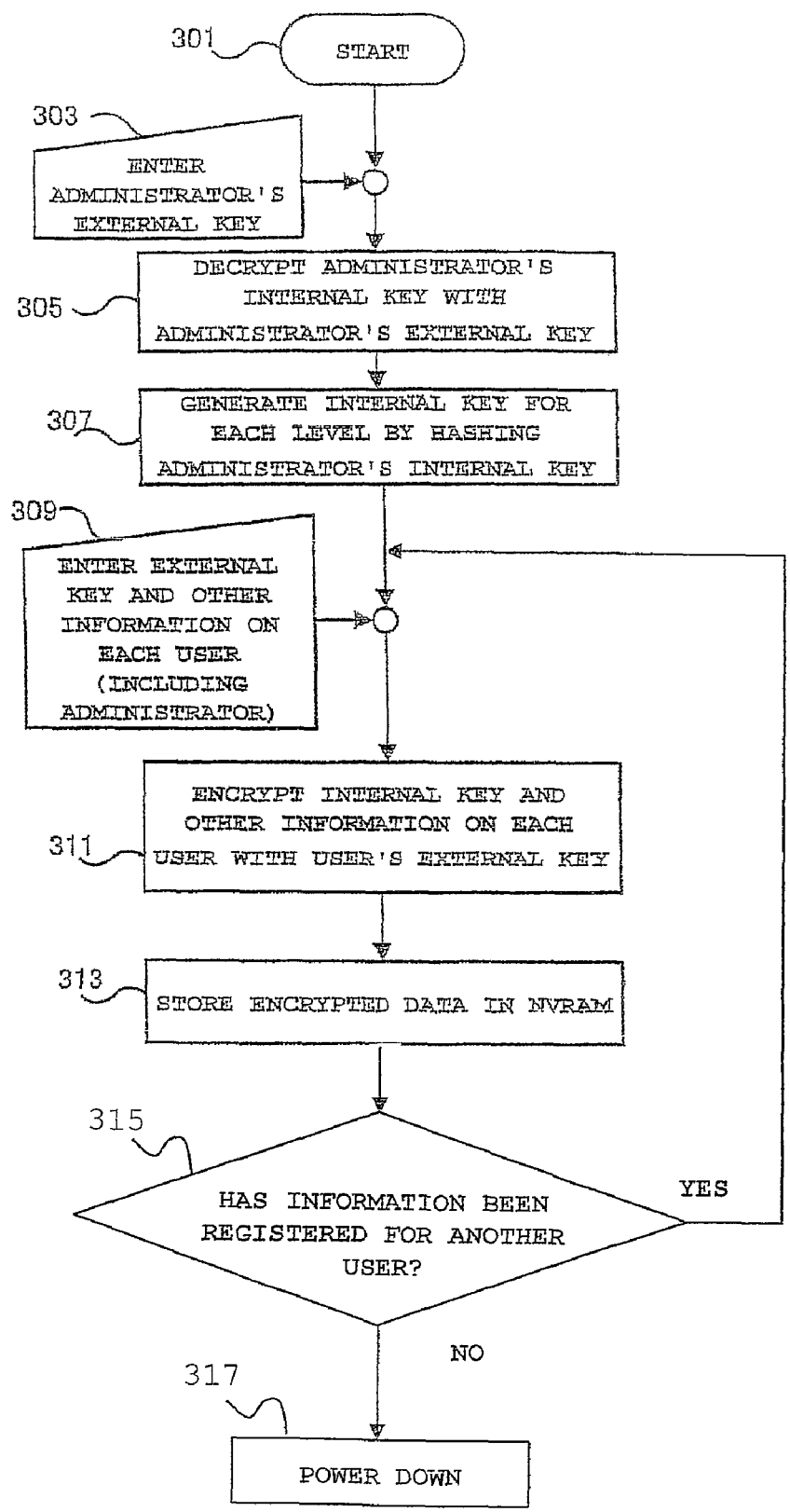
FIG. 8 is a flowchart of user registration processing.

FIG. 8 is a flowchart of the user registration processing, in accordance with a preferred embodiment of the present invention. FIG. 9 is a diagram showing the content displayed on the screen of display 25 during the execution of the user registration processing shown in FIG. 8. In FIG. 9, lines beginning with the symbol ">" represent the content entered by an operator via the keyboard 37. When the user registration processing is started (block 301), an entry screen (screen display 351) is displayed on the display 25. According to the entry screen, the administrator performing this operation first enters the administrator's user ID and login password, which is the external key (block 303). This confirms that the operator is the authentic administrator. The internal key for the user level 0 is decrypted with the administrator's external key entered at block 303 (block 305), and further the internal keys for the user levels 1 and 2 are generated using the above-described hash function (block 307). Then, the operator enters the administrator's own user information, name, division the administrator belongs to, login ID for the OS, and so forth (block 309, screen display 353). When the operator has completed the entry and confirmed the entered content (screen display 355), the entered user information and the internal key for the user level 0 are encrypted with the administrator's external key (block 311) and stored in secure NVRAM 33 (block 313).

On completion of storing the user information on the administrator, the operator selects whether or not to register information on another user (block 315, screen display 357). If "N" (NO) is selected, the user registration processing terminates without registration of users other than the administrator, and notebook PC 10 is powered down (block 317). If "Y" (YES) is selected at block 315, entry of information on another user is started (block 309, screen display 359). The information on another user is entered beginning with the user's user ID, initial password, which is the external key, and the user's user level, as well as the user's name, division the user belongs to, OS login ID, and so forth. When the operator has completed the entry and confirmed the entered content, the entered user information and the internal key for the user level are encrypted with this user's external key (block 311) and stored in secure NVRAM 33 (block 313). Subsequently, the entry and processing from blocks 309 to 315 and screen display 359 are repeated for each user to be registered.

In this manner, the information on each user encrypted with the user's external key is stored in secure NVRAM 33 in the form shown in FIG. 5. On completion of the user registration processing, notebook PC 10 may be powered off, or user login processing to be described later may be started. In the processing so far, all information entered by the operator via keyboard 37 is encrypted in SMRAM area 71 of main memory 21. After completion of the encryption, the information is stored in secure NVRAM 33 from SMRAM area 71. Thus, the information in an unencrypted form will never leak out of SMRAM area 71. Also, since CPU 11 is operating in single task SMM with the control of system BIOS 51, no processes other than the operation program 57 of the password sharing system will run or refer to SMRAM area 71. Therefore, malicious software, such as a computer virus, spyware, and key logger, will never obtain unencrypted passwords or internal keys.

Figure 10:
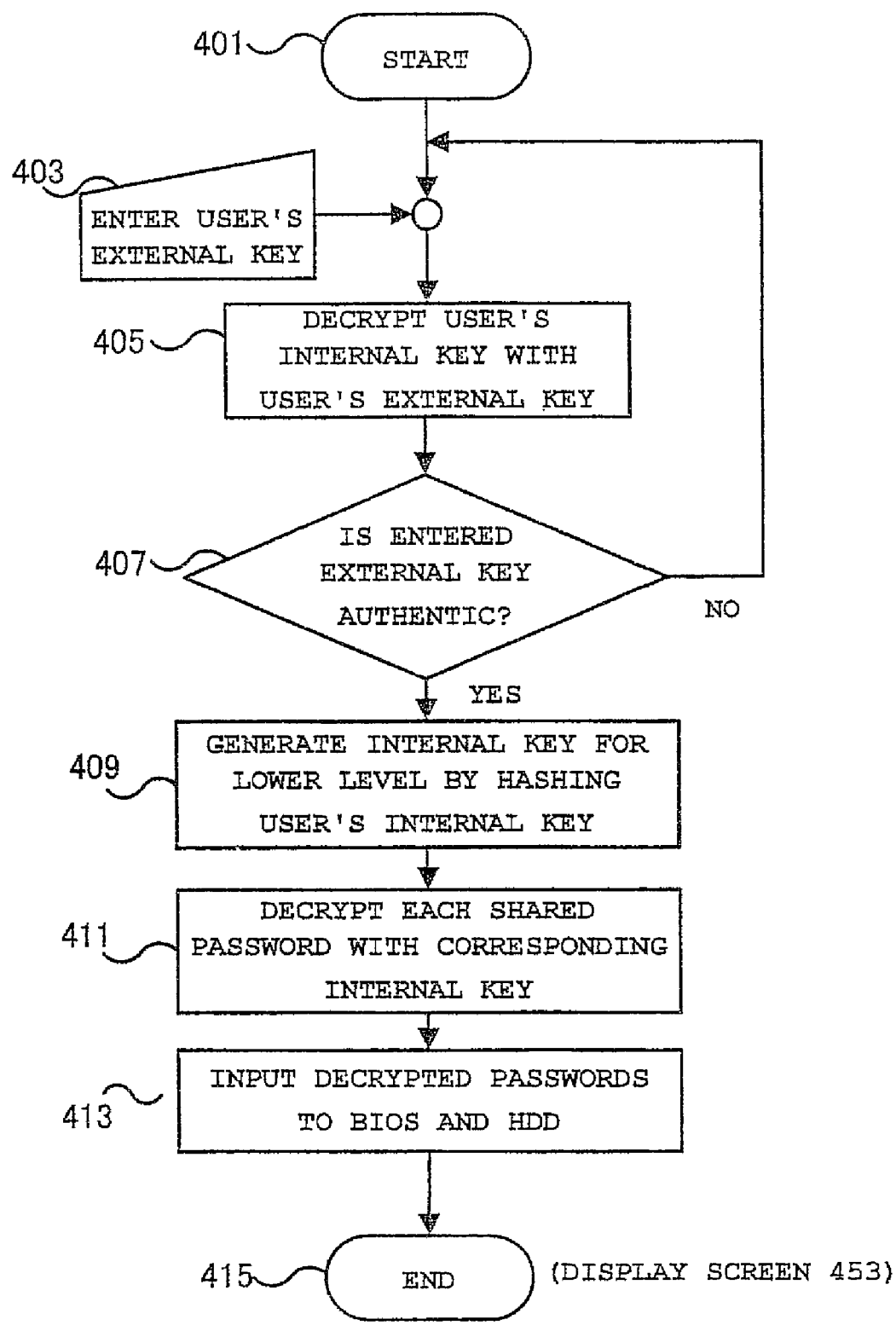
FIG. 10 is a flowchart of user login processing.
Figure 12:
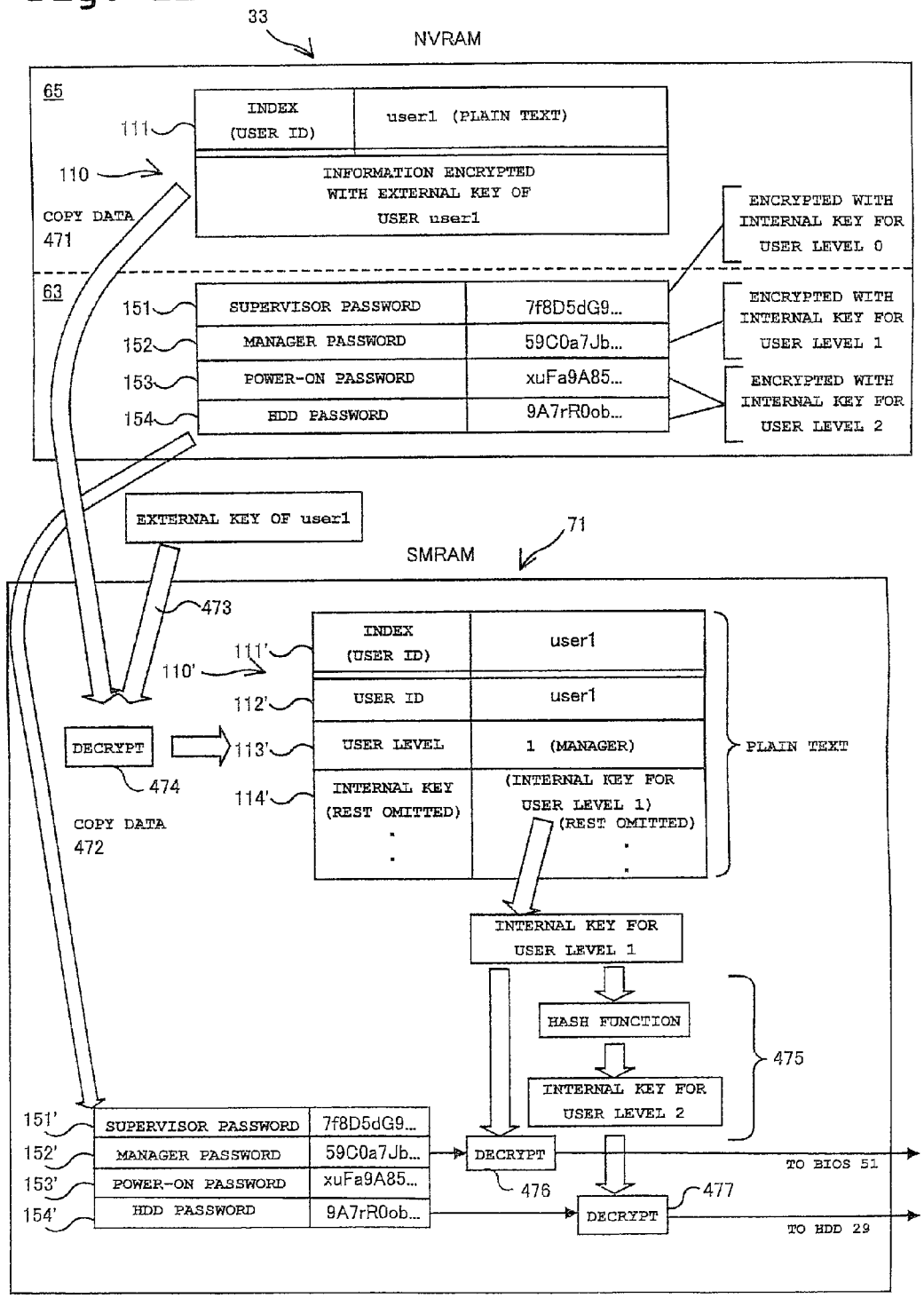
FIG. 12 is a conceptual view showing data transitions and operations during the execution of the user login processing shown in FIG. 10.

FIG. 10 is a flowchart of the user login processing of the password sharing system, in accordance with a preferred embodiment of the present invention. FIG. 11 is a diagram showing the content displayed on the screen of display 25 during the execution of the user login processing shown in FIG. 10. FIG. 12 is a conceptual view showing data transitions and operations during the processing of FIG. 10. In FIG. 11, lines beginning with the symbol ">" represent the content entered by an operator via keyboard 37. When a password is entered, all entered characters displayed are replaced with the symbol "*." Description will be given here for the case where a user having the user ID "user1" at the user level 1 (the manager) starts notebook PC 10 (block 401) and logs in. Read/write protection is not set for secure NVRAM 33 when notebook PC is started. SMI handler 59 is called from the BIOS flash ROM 31, and this causes CPU 11 to operate in SMM. Operation program 57 of the password sharing system is read into the SMRAM area 71 of main memory 21 from BIOS flash ROM 31. Further, shared passwords 63 and data 65 on each user are read and copied into the SMRAM area 71 of main memory 21 from secure NVRAM 33 (operations 471 to 472, copied data set 110', copied shared passwords 151' to 154').

First, the operator performing this operation enters the operator's user ID and login password, which is the external key (block 403, screen display 451, operation 473). The data set 110' containing internal key 114 of the user corresponding to the entered user ID "user1" is decrypted with the user's external key entered at block 403 (block 405, operation 474). If the plain text index 111' and the user ID 112' obtained by decrypting encrypted user ID 112 are identical, it is determined that the entered external key is authentic, and the login succeeds (block 407). If the entered external key is not authentic, the processing returns to the entry of the external key (block 403, screen display 451). The internal key for the user level 2 is generated from the decrypted internal key 114' for the user level 1, wherein the internal key for the user level 2=Hash (the internal key for the user level 1) (block 409, operation 475). Among the shared passwords, the manager password 152' is decrypted with the internal key 114' for the user level 1 (block 411) and is input to the system BIOS 51 (block 413, operation 476). HDD password 154' is decrypted with the internal key for the user level 2 (block 411) and is input to hard disk drive 29 (block 413, operation 477). This completes the user authentication processing by the BIOS (block 415), and screen display 453 indicating the login success is displayed.

As seen from the description above, the user at the user level 1 can obtain the internal key for the user level 1 by decrypting the user's data set with the user's external key. Further, the user can obtain the internal key for the user level 2 by hashing the internal key for the user level 1. Therefore, among the shared passwords, the user can decrypt and use the passwords encrypted with the internal keys for the user levels 1 and 2. In the present case, the user can use manager password 152' encrypted with the internal key for the user level 1, and the power-on password 153' and HDD password 154' encrypted with the internal key for the user level 2. It is noted that the user at the user level 1 normally does not use power-on, password 153' because the user uses manager password 152'. However, since it is practically impossible to obtain the internal key for the user level 0 using the internal key for the user level 1 as described above, the user cannot use the supervisor password 151'. The user at the user level 2 can obtain the internal key for the user level 2, so that this user can use the power-on password 153' and HDD password 154' for the user level 2, but cannot use other shared passwords for the user levels 0 and 1. The user at the user level 0 can use all shared passwords.

Entry of 0 or no entry for ten seconds on the login success screen display 453 causes the OS to be started. The starting of the OS will be described below. Entry of 1 allows modifying the BIOS settings to the extent possible with the manager password. Entry of 2 causes a screen to be displayed as shown in 455, on which the password for the user ID "user1" can be changed. Entry of 3 allows changing the shared passwords to the extent possible with the manager password, which will be described later. Entry of 4 causes a screen to be displayed as shown in 457, on which the user information on all users at the user levels 1 and 2 can be modified. When the starting of the OS is selected on the login success screen display 453, POST 55 is started from BIOS-ROM 31 to test the hardware, and then read/write protection is set for secure NVRAM 33. INT13H handler 60 is called to activate magnetic disk drive 29, and the starting of the OS begins.

Figure 13:
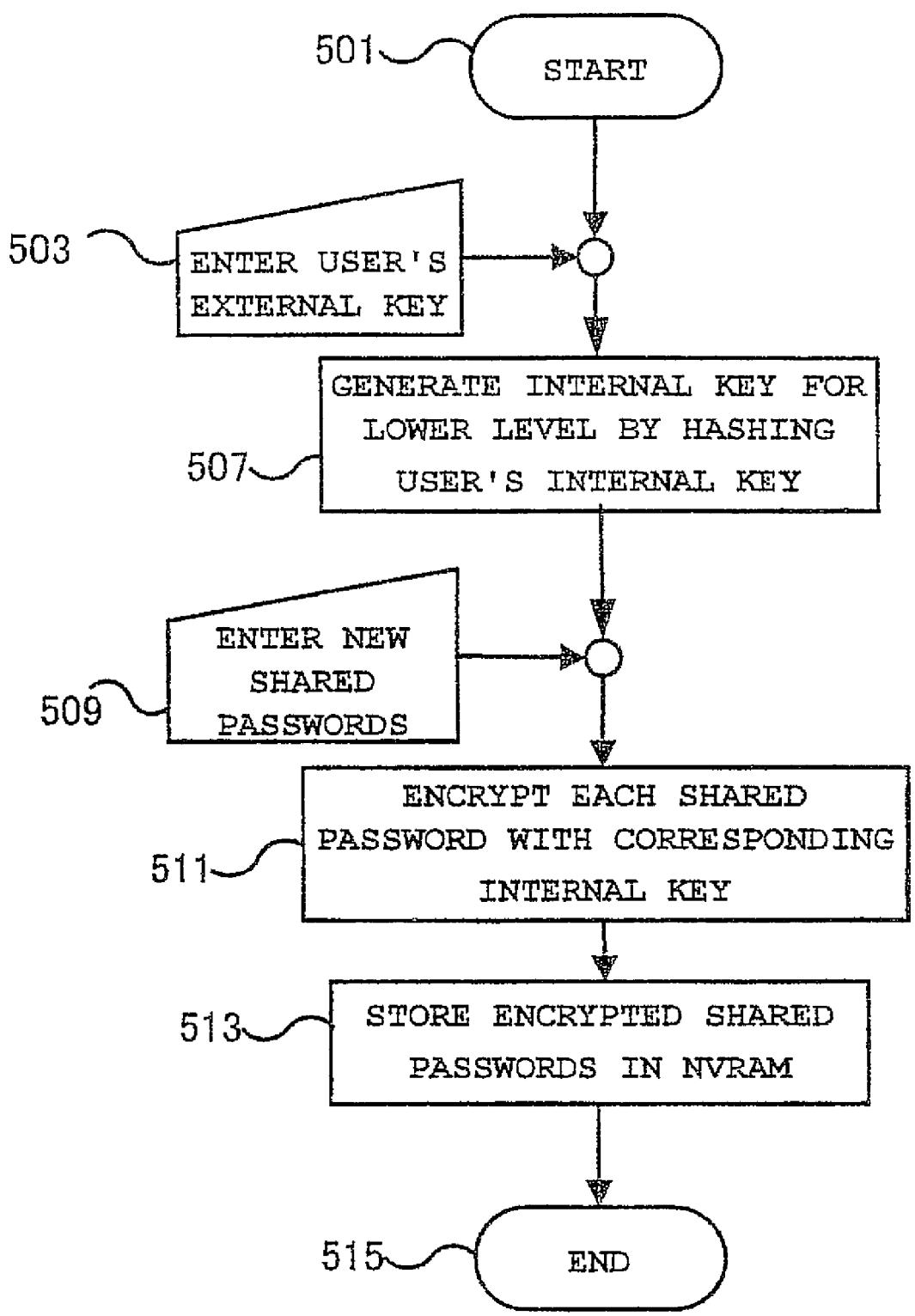
FIG. 13 is a flowchart of changing shared passwords by a user.
Figure 15:
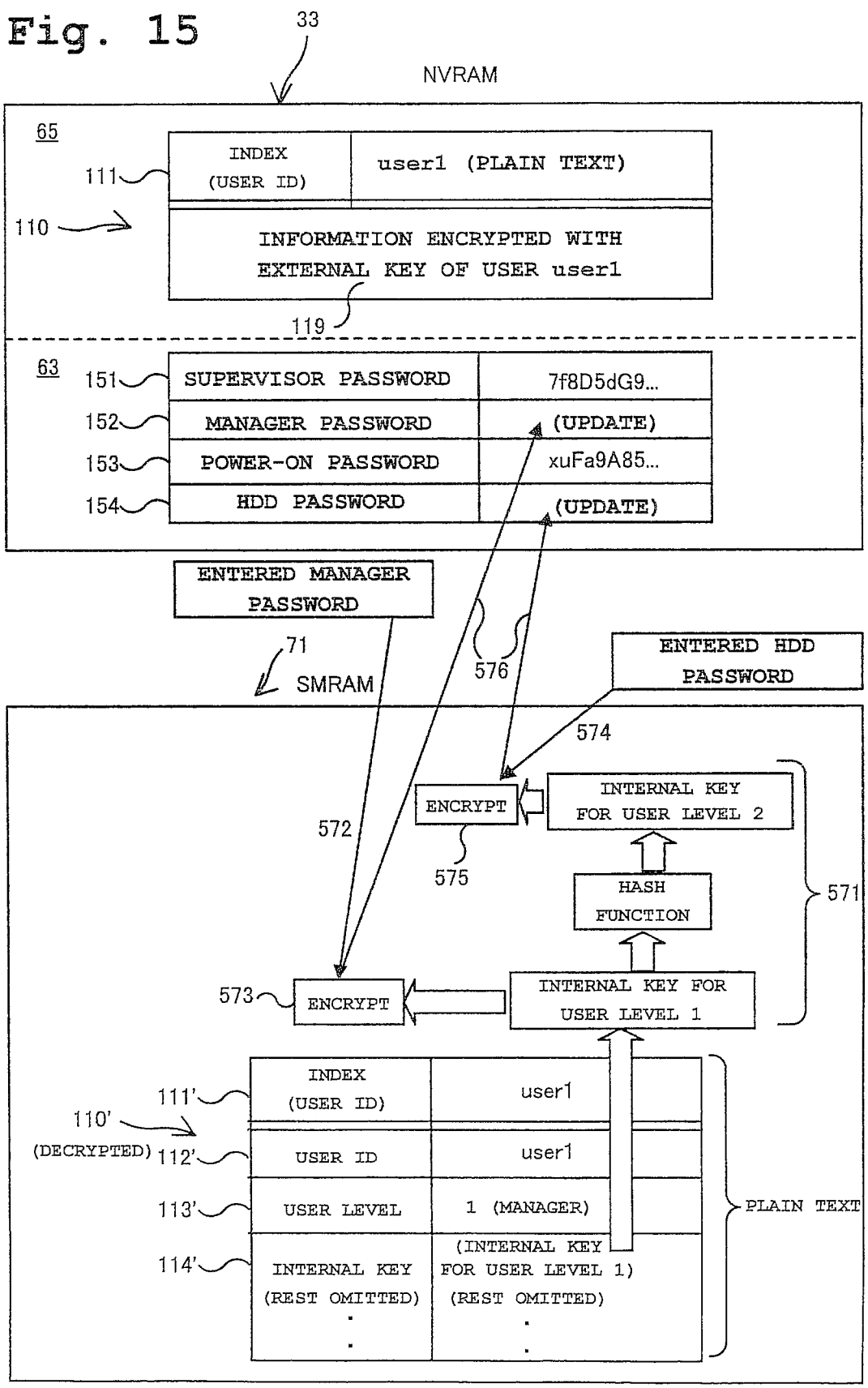
FIG. 15 is a conceptual view showing data transitions and operations during the execution of the changing shared passwords shown in FIG. 13.

FIG. 13 is a flowchart of processing of changing the shared passwords by a user in the password sharing system according to the present invention. FIG. 14 is a diagram showing the content displayed on the screen of display 25 during the execution of the processing shown in FIG. 13. FIG. 15 is a conceptual view showing data transitions and operations during the execution of the processing shown in FIG. 13. In FIG. 14, lines beginning with the symbol ">" represent the content entered by an operator via the keyboard 37. When a password is entered, all entered characters displayed are replaced with the symbol "*." Description will be given here for the case where a user having the user ID "user1" at the user level 1 (the manager) changes the shared passwords. The user has already successfully logged in by entering a proper external key. When the user enters "3 Change shared passwords" in the menu selectable on screen display 453, the shared password changing processing described below is performed.

When the shared password changing processing is started (block 501), the operator performing this operation enters the operator's user ID and login password, which is the external key (block 503, screen display 551). This confirms that the operator is the authentic manager. On the second confirmation of the operator's will to change the shared passwords (screen display 553), the internal key for the user level 2 is generated from the internal key 114' for the user level 1 contained in the data set 110' corresponding to the user ID "user1" that has already been copied from the secure NVRAM 33 into the SMRAM and decrypted, wherein the internal key for the user level 2=Hash (the internal key for the user level 1) (block 507, operation 571).

Entry of new changed passwords is received for the manager password and the HDD password that can be handled at the user level 1 among the shared passwords (block 509, screen display 555). The entered manager password (operation 572) is encrypted with the internal key 114' for the user level 1 (block 511, operation 573). The entered HDD password (operation 574) is encrypted with the internal key for the user level 2 (block 511, operation 575). These passwords are stored in the shared passwords 63 of the secure NVRAM 33 (block 513 operation 576). Thus, the shared password changing processing terminates (block 515). Thereafter, notebook PC 10 may be powered down, or the processing may return to the login success screen display 453, where the OS may be started.

After completion of the above processing, when a user other than the one who has changed the shared passwords powers up notebook PC 10 and enters the user's external key, the internal key for the user level of this user is properly decrypted if the user's external key is authenticated. Even though the shared passwords have been changed, the external key and internal key of each user are not affected by the changes. Furthermore, with the internal key for the user level of this user, the shared password for this user level is properly decrypted and made available. Therefore, although the user who has changed the shared passwords does not inform other users of the changed shared passwords, all users can use the changed shared passwords for their respective user levels. Of course, the user at the user level 1 can obtain the internal keys for the user levels 1 and 2 as in the case of login, so that this user can change the passwords encrypted with the internal keys for the user levels 1 and 2 among the shared passwords. However, since it is practically impossible for this user to obtain the internal key for the user level 0 as described above, this user cannot change the shared password for the user level 0. The user at the user level 2 can obtain only the internal key for the user level 2, so that this user can change only the shared password for the user level 2 but cannot change the shared passwords for the user levels 0 and 1. The user at the user level 0 can change all shared passwords.

Some variations of the above-described embodiment of the present invention may be contemplated. For example, in a notebook PC with the TPM (Trusted Platform Module), which is a module for enhancing security, nonvolatile memory typically provided in the TPM may replace secure NVRAM 33 in the above-described embodiment. Of course, again, read/write operations for the nonvolatile memory can be disabled and therefore no problems are caused in implementing the present invention. Also, all or part of the information about user authentication may be communicated over a network. In that case, the network communication method needs to employ a secure protocol to prevent the information communicated over the network from interception.

The above-described method of authenticating the entered external key involves comparing a user ID obtained by decrypting encrypted user ID 102 with plain text user ID 101. Another possible method involves decrypting the internal key with the external key, decrypting the shared passwords with the internal key, inputting the shared passwords to system BIOS 51 and hard disk drive 29, and authenticating based on whether or not the BIOS and the disk device are made usable. In this method as well, the entered external key can be authenticated without storing the external key in notebook PC 10. Therefore, the risk that someone knows the external key from information stored in the computer is similarly low. In this case, the data set 100 need not contain encrypted user ID 102.

Figure 16:
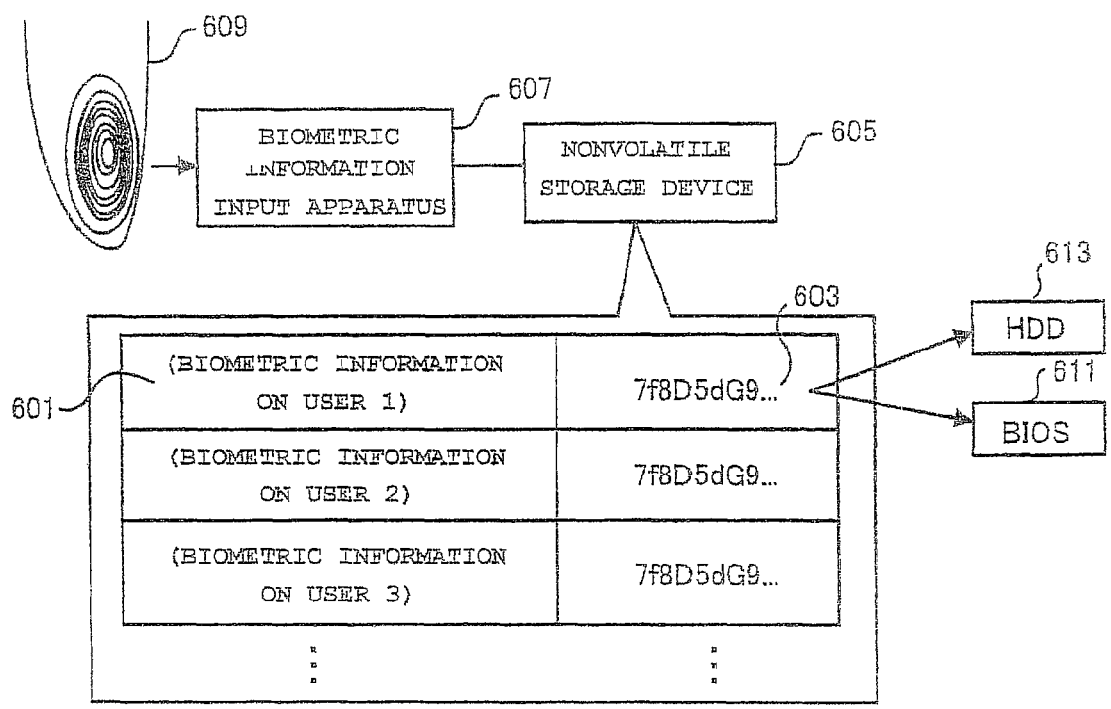
FIG. 16 is a block diagram showing the application of a technique of user authentication using biometrics information, according to the prior art.

Furthermore, in initialization of the password sharing system, the operator may be made to enter all or part of the shared password. The entered character string may be directly used as the shared password, or may be used after being subjected to some conversion, such as hashing the entered character string. In addition, instead of the passwords comprised of a character string as described above, the external key may be biometrics information on the user such as a fingerprint, vein, or iris as in the conventional art shown in FIG. 16, or electronic information stored on a smart card or a USB token, or a combination of these information items. Of course, the computer to which the present invention is applied is not limited to a notebook PC. For example, since even a desktop computer has a risk that it is stolen and data inside is read out, the present invention may be advantageously applied.

As has been described, the present invention provides an improved method and apparatus for managing shared passwords on a multi-user computer.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include storage media such as floppy disks or compact discs.

While the invention has been particularly shown and described with reference to a preferred embodiment, it will be understood by those skilled in the art that various changes in form and detail may be made therein without departing from the spirit and scope of the invention.

What is claimed is:

1. A method for managing shared passwords on a multi-user computer system, said method comprising:
   generating a set of shared passwords, wherein said set of shared passwords includes at least a hard disk drive password and one of a supervisor password and a power-on password;
   generating an administrator internal key;
   receiving an administrator external key;
   encrypting said administrator internal key with said administrator external key;
   generating a user level internal key for each non-administrator user level within said computer system by hashing said administrator internal key, wherein said computer system includes at least two user levels;
   encrypting, for each user level, one or more of said set of shared passwords with a user level appropriate one of said user level internal keys;
   storing said encrypted administrator internal key and said encrypted set of shared passwords in a non-volatile storage device; and
   controlling utilization of said computer system by users based on an assigned user level for each of said users.

2. The method of claim 1, wherein said set of shared passwords is generated based on present date and time available from a real time clock or an ID unique to said computer system.

3. The method of claim 1, wherein said administrator internal key is generated based on a random number.

4. The method of claim 1, wherein said method further includes:
   registering users based on receiving said administrator external key;
   decrypting said encrypted administrator internal key with said administrator external key;
   receiving a user external key and associated information for a user;
   encrypting a user internal key and said associated information for said user with said user external key, wherein said user internal key corresponds to one of said user level internal keys; and
   storing said encrypted user internal key and said associated information for said user in said non-volatile storage device.

5. The method of claim 4, wherein said method further includes:
   processing a user login based on receiving said user external key;
   decrypting said encrypted user internal key with said user external key;
   decrypting one of said set of shared passwords with said decrypted user internal key; and
   sending said decrypted shared password to a basic input/output system (BIOS) of said computer system to activate further functions.

6. A computer program product embodied on a signal bearing device configured for managing shared passwords on a multi-user computer system, said computer program product comprising:
   program code for generating a set of shared passwords, wherein said set of shared passwords includes at least a hard disk drive password and one of a supervisor password and a power-on password;
   program code for generating an administrator internal key;
   program code for receiving an administrator external key;
   program code for encrypting said administrator internal key with said administrator external key;
   program code for generating a user level internal key for each non-administrator user level within said computer system by hashing said administrator internal key, wherein said computer system includes at least two user levels;
   program code for encrypting, for each user level, one or more of said set of shared passwords with a user level appropriate one of said user level internal keys;
   program code for storing said encrypted administrator internal key and said encrypted set of shared passwords in a non-volatile storage device, wherein said signal bearing device is a storage device; and
   program code for controlling utilization of said computer system by users based on an assigned user level for each of said users.

7. The computer program product of claim 6, wherein said set of shared passwords is generated based on present date and time available from a real time clock or an ID unique to said computer system.

8. The computer program product of claim 6, wherein said administrator internal key is generated based on a random number.

9. The computer program product of claim 6, wherein said computer program product further includes:
   computer code for registering users based on receiving said administrator external key;
   computer code for decrypting said encrypted administrator internal key with said administrator external key;
   computer code for receiving a user external key and associated information for a user;
   computer code for encrypting a user internal key and said associated information for said user with said user external key, wherein said user internal key corresponds to one of said user level internal keys; and
   computer code for storing said encrypted user internal key and said associated information for said user in said non-volatile storage device.

10. The computer program product of claim 9, wherein said computer program product further includes:
    computer code for processing a user login based on receiving said user external key;

computer code for decrypting said encrypted user internal key with said user external key;

computer code for decrypting one of said encrypted set of shared passwords with said decrypted user internal key; and computer code for sending said decrypted shared password to a basic input/output system (BIOS) of said computer system to activate further functions.

11. A multi-user computer system capable of managing shared passwords, said computer system comprising:

a password generating means for generating a set of shared passwords, wherein said set of shared passwords includes at least a hard disk drive password and one of a supervisor password and a power-on password;

a key generating means for generating an administrator internal key;

a key entry means for receiving an administrator external key;

a processing means for encrypting said administrator internal key with said administrator external key;

said key generating means for generating a user level internal key for each non-administrator user level within said computer system by hashing said administrator internal key, wherein said computer system includes at least two user levels;

said processing means for encrypting, for each user level, one or more of said set of shared passwords with a user level appropriate one of said user level internal keys;

a non-volatile storage device for storing said encrypted administrator internal key and said encrypted set of shared passwords; and said processing means configured to control utilization of said computer system by users based on an assigned user level for each of said users.

12. The computer system of claim 11, wherein said set of shared passwords is generated based on present date and time available from a real time clock or an ID unique to said computer system.

13. The computer system of claim 11, wherein said administrator internal key is generated based on a random number.

14. The method of claim 1, wherein said set of shared passwords include said supervisor password at a highest user level, a manager password at a middle user level, and said power-on password and said hard disk drive password at a lowest user level.

15. The computer program product of claim 6, wherein said set of shared passwords include said supervisor password at a highest user level, a manager password at a middle user level, and said power-on password and said hard disk drive password at a lowest user level.

16. The computer system of claim 11, wherein said set of shared passwords include said supervisor password at a highest user level, a manager password at a middle user level, and said power-on password and said hard disk drive password at a lowest user level.

* * * * *